US 10,860,552 B2

(12) United States Patent
Bethmann

(10) Patent No.: US 10,860,552 B2
(45) Date of Patent: Dec. 8, 2020

(54) DISTRIBUTED RESOURCE PARALLEL-OPERATED DATA SORTING SYSTEMS AND METHODS

(71) Applicant: Schweitzer Engineering Laboratories, Inc., Pullman, WA (US)

(72) Inventor: Glenn C. Bethmann, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 212 days.

(21) Appl. No.: 15/455,459

(22) Filed: Mar. 10, 2017

(65) Prior Publication Data

US 2018/0260422 A1    Sep. 13, 2018

(51) Int. Cl.
| G06F 16/215 | (2019.01) |
| G06F 16/22 | (2019.01) |
| G06F 16/21 | (2019.01) |
| G06F 16/2453 | (2019.01) |
| G06F 16/2455 | (2019.01) |

(52) U.S. Cl.
CPC .......... *G06F 16/215* (2019.01); *G06F 16/214* (2019.01); *G06F 16/22* (2019.01); *G06F 16/24532* (2019.01); *G06F 16/24568* (2019.01)

(58) Field of Classification Search
CPC ............. G06F 17/30303; G06F 17/303; G06F 17/30312; G06F 17/30445
See application file for complete search history.

(56) References Cited

U.S. PATENT DOCUMENTS

| 7,489,689 B2 * | 2/2009 | Ma ...................... H04L 41/0896 370/256 |
| 2006/0031593 A1* | 2/2006 | Sinclair ................... G06F 13/42 709/251 |
| 2014/0237001 A1* | 8/2014 | Guirguis ............... G06Q 10/06 707/802 |
| 2014/0379676 A1* | 12/2014 | McKenney ......... G06F 16/2336 707/704 |
| 2015/0293951 A1* | 10/2015 | Yamasaki ............. G06F 16/285 707/738 |
| 2015/0347592 A1* | 12/2015 | Buyuktosunoglu ..... G06F 16/22 711/122 |
| 2016/0139900 A1* | 5/2016 | Pudiyapura ............. G06F 8/451 717/149 |
| 2016/0188643 A1* | 6/2016 | Sun .......................... G06F 7/06 707/741 |
| 2017/0060912 A1* | 3/2017 | Liu ..................... G06F 16/2246 |
| 2018/0165173 A1* | 6/2018 | Lin ..................... G06F 11/3476 |

* cited by examiner

*Primary Examiner* — Ashish Thomas
*Assistant Examiner* — Aryan D Toughiry
(74) *Attorney, Agent, or Firm* — Stoel Rives LLP; Bradley W. Schield

(57) ABSTRACT

A distributed resource parallel-operated rotating data-sorting network is disclosed. The rotating data-sorting network is an ultra-low latency design that may sift and sort values of interest from a continuous data stream or finite data set. The rotating data-sorting network includes a circular data structure that rotates through data sets and comprises a series of nodes.

22 Claims, 6 Drawing Sheets

DISTRIBUTED RESOURCE PARALLEL-OPERATED DATA SORTING SYSTEMS AND METHODS

TECHNICAL FIELD

The present disclosure relates generally to data sorting. Specifically, the present disclosure relates to sorting data streams.

BRIEF DESCRIPTION OF THE DRAWINGS

The written disclosure herein describes illustrative embodiments that are non-limiting and non-exhaustive. Reference is made to certain of such illustrative embodiments that are depicted in the figures described below.

DETAILED DESCRIPTION

Figure 1:
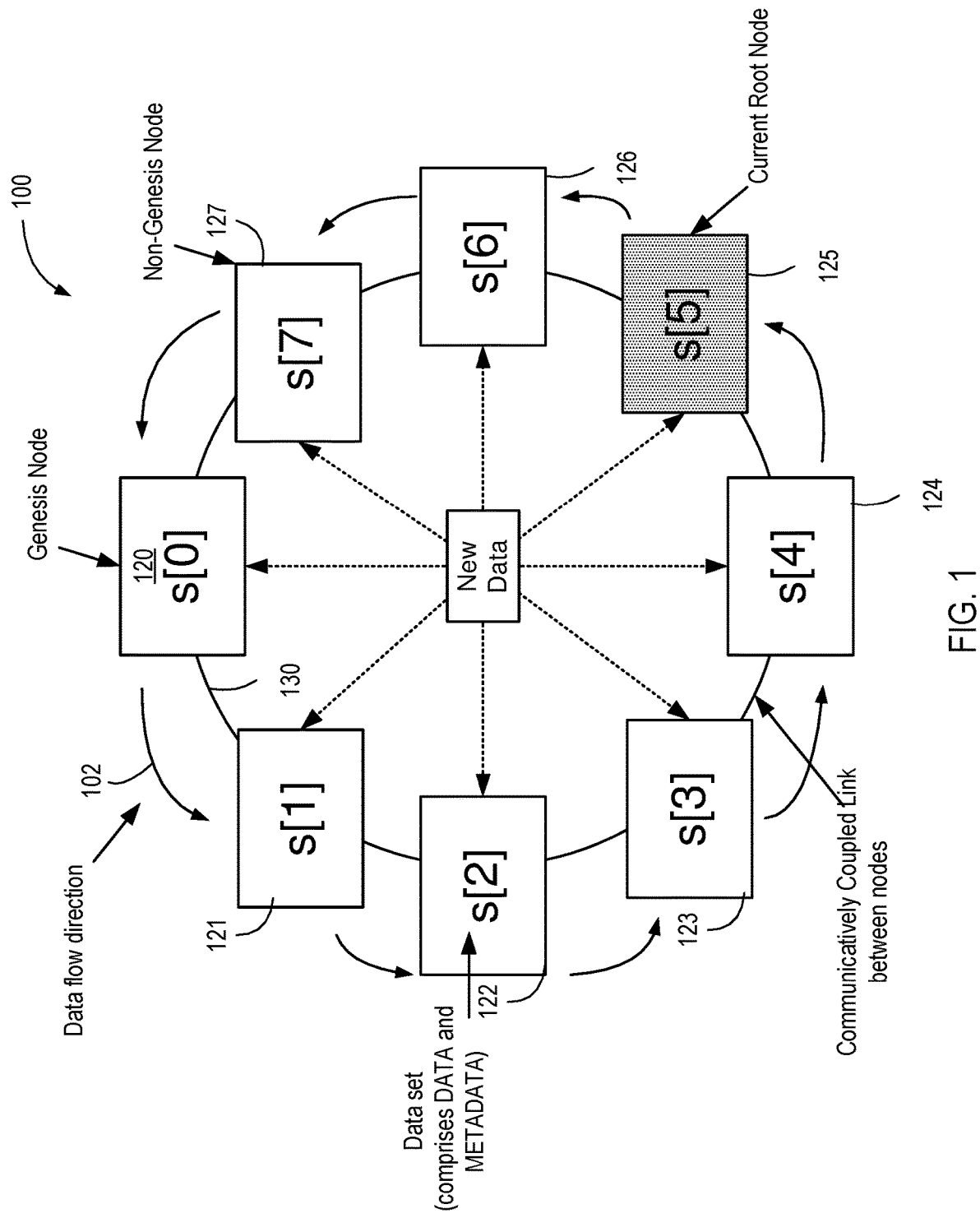
FIG. 1 is a rotating data-sorting network with eight nodes, according to one embodiment.

Data processing systems may order unorganized data according to a preplanned procedure. The preplanned procedure may be referred to as a sorting method. Ordering data using sorting methods may facilitate post-sorting processing, such as finding a minimum or a maximum value, graphing data, or performing a statistical analysis. However, traditional sorting methods become resource-intensive when ordering long sets or continuous streams of data, increasing memory use and latency. To improve the efficiency of a data processing system, a circular data structure, as described herein, may be implemented to sort a finite list of values and/or sift through a continuous data stream to order values of interest.

The embodiments described herein include methods and systems rooted in computer technology in order to overcome a problem specifically arising in the realm of computer processing. Processing of a stream of data values using traditional sorting methods is a resource-intensive endeavor. Sorting methods described herein may be utilized to improve processing times and reduce memory usage. In one embodiment, a distributed resource parallel-operated data-sorting structure ("rotating data-sorting network") may provide a flexible, lightweight, rotating data-sorting network designed for minimal latency and resources. This rotating data-sorting network may comprise a circular data structure, which can sort a finite list of size N. Additionally, the rotating data-sorting network may sift a data stream by detecting and sorting values of interest in a data stream.

The rotating data-sorting network may accelerate the effective sorting time, relative to existing technology, by starting the sorting operation without all of the unsorted values being completely sourced and/or stored. For instance, when a new value is received, instead of completing a comparison followed by a complete re-sort of an entire list, the rotating data-sorting network may compare a value and insert the value to maintain the ordered list without the need for a re-sort.

The rotating data-sorting network is composed of distributed resources referred to herein as nodes. Distributed, as used herein, refers to a computing system that coordinates and enables communication between nodes. Each node has one or more comparators associated with it to compare a present value stored in the node to a new value received. Because each node has at least one comparator, each node's comparison may operate in parallel with the comparisons for the other nodes. As used herein, parallel refers to a type of computation in which many calculations or the execution of processes are carried out simultaneously. The parallel distributed characteristics of the rotating data-sorting network provides a system that may efficiently maintain a sorted list as new values are introduced by communicating between nodes operating in parallel.

The memory, space, and resource requirements of the rotating data-sorting network grow at a linear rate of O(N), and the time complexity is fixed at either O(1) for a single element, or O(N) for a series of data. These features may enable the rotating data-sorting network to eliminate variations in the best, worst, and average sort times. Thus, the rotating data-sorting network may sort each data received at a fixed length of time regardless of the number of nodes.

One embodiment of a sorting method may involve digital signal processing of analog waveforms. For example, it may be desirous to collect and sort data on a specified number of peak values from a continuous stream of analog waveforms. In various embodiments, data processing systems may sample voltage, current, or other data points of a three-phase electric power system. In order to determine whether an incoming value satisfies the criteria of a "maximum value," existing technology may require a time-consuming verification system to compare the incoming value to existing values stored in memory. After verification that the new value is a higher maximum value than one of the previously stored values, the lowest stored maximum value may be replaced by the new value.

However, existing processes for sorting such data may be time-consuming and limit the number of values that may be processed in a given time period. For example, other sorting methods may be able to quickly identify whether data should be inserted into the list, but those methods are inefficient at inserting data while maintaining an ordered list. For instance, in previous sorting methods, a lowest value is replaced with the new value. The list order is not maintained when the new value is not the list minimum. Therefore a system following this approach would process a complete re-sort and potential shuffle of the values. Additionally, existing comparator networks or other sorting methods may have inconsistent sorting times, memory, space, and resource constraints; may not fit in field programmable gate arrays (FPGAs); may not maintain a relative order of entries with equal values; and may wait to process a specified number of elements until all values are stored in a memory.

Disclosed is a data processing system with an ultra-low latency design that is optimal for when time-critical sorting results are required. The ultra-low latency data processing system maintains a sorted list without the need to re-sort or shuffle data in the list. The ultra-low latency data processing system includes a rotating data-sorting network.

In some embodiments, the rotating data-sorting network may comprise a plurality of nodes that may be communicatively coupled in a closed loop. The nodes may sort and store values from a data stream, and identify a current root node comprising a first value of the sorted values. Once all of the nodes are filled and a new data value is received, the rotating data-sorting network may compare the new data value to the sorted values stored in the plurality of nodes, and determine if the new data value meets a target criteria based on the comparison. For example, target criteria may include determining if the new data value is more than at least one of the sorted values stored in the plurality of nodes. Such a target criteria would find the maximum values of a data stream. Based on the determination, the rotating data-sorting network may either discard the new data value and rotate the node values, or discard the first value stored in the current root node. The rotating data-sorting network may rotate values stored in a portion of the plurality of nodes by moving the value in each node to an adjacent node in the closed loop, and store the new data value in a node at the beginning of the shifted portion of the plurality of nodes. The rotating data-sorting network may identify a new current root node adjacent to the current root node.

A rotating data-sorting network may include a processor (which may be a microprocessor, FPGA, application specific integrated circuit (ASIC), or the like) that may be configured to coordinate one or more desired functions (e.g., measure, compare, analyze, normalize, etc.). A processor may perform distributed (e.g., parallel) processing to execute or otherwise implement functionalities of the present embodiments. A processor may run a standard operating system and perform standard operating system functions. It is recognized that any standard operating system may be used, such as, for example, Microsoft® Windows®, Apple® MacOS®, Disk Operating System (DOS), UNIX, IRJX, Solaris, SunOS, FreeBSD, Linux®, QNX®, ffiM® OS/2® operating systems, and so forth.

As used herein, the phrases "coupled to," "communicatively coupled to," and "in communication with" are broad enough to refer to any suitable coupling or other form of interaction between two or more components, including electrically, mechanical, fluid, and thermal interaction. Two components may be coupled to each other even though there may be intermediary devices between the two components.

As used herein, data is any set of values having predefined characteristics. Data may have various types including Booleans, strings, integers, floats, arrays, or objects. Metadata is information that describes and gives information about other data.

A "protection relay" or "relay" is a switch that can open and/or close one or more circuits electromechanically or electronically. A relay may protect distribution or transmission circuits by tripping and closing a breaker under abnormal conditions. Protective relays can prevent equipment damage by detecting electrical abnormalities, including an arc flash event, faults, unbalance conditions, overcurrent conditions, power swing conditions, and the like.

As used herein, an intelligent electronic device (IED) may refer to any one or combination of a central processing unit (CPU)-based relay and/or protective relay, a communication processor, a digital fault recorder, a phasor measurement unit (PMU), a phasor measurement and control unit (PMCU), a phasor data concentrator (PDC), a wide area control system (WACS), a relay with phasor measurement capabilities, a wide area protection system (WAPS), a Supervisory Control and Data Acquisition (SCADA) system, a system integrity protection scheme, or any other device capable of monitoring and/or protecting an electrical power system. The term "IED" may be used interchangeably to describe an individual IED or a system comprising multiple IEDs.

One embodiment of a rotating data-sorting network may be included on an IED with a CPU coupled to a random access memory (RAM), a read only memory (ROM), a display, a user input, a modulator/demodulator (MODEM), and/or a storage medium interface. The CPU may be a microprocessor such as a reduced instruction set computer (RISC) or complex instruction set computer (CISC). The ROM may store program instructions to be executed by the CPU. The RAM may store data to be processed by the CPU and program registers. The MODEM may be coupled to a communications link and enable the CPU to receive and transmit data to and from another processor. The MODEM may be coupled to a local area network (LAN), an Internet, or another communications link. The storage medium interface may enable data transfers between the CPU and a storage medium. The storage medium interface may be any interface that enables communication between the CPU and storage medium, such as small computer system interface (SCSI), industry standard architecture (ISA), peripheral component interconnect (PCI), and others. The CPU may receive data including database records from a storage medium coupled to the storage medium interface or via the MODEM from almost any location.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that perform one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

A rotating data-sorting network may further couple to a human machine interface (HMI), which may include a display, an attached computer, or the like. The computer storage media may contain one or more input/output interfaces that facilitate HMI. The input device(s) may include a keyboard, mouse, button, touch screen, light pen, tablet, microphone, sensor, or other hardware with accompanying firmware and/or software. The output device(s) may include a monitor or other display, printer, speech or text synthesizer, switch, signal line, graphical user interface, or other hardware with accompanying firmware and/or software. A display may enable the CPU to display data or information to a user in a human-readable format. The display may be any display device including a light emitting diode (LED), liquid crystal display (LCD), and others. The user may provide an input to the CPU to perform operations on database records, including sorting a group of records based on one or more fields where the fields of the records are to be sorted.

The rotating data-sorting network may be extendable to accommodate a target number of values. For instance, new nodes may be introduced to store additional values. A sort key, input by a user or generated by the CPU, may include a set of parameters that specify characteristics of data of interest to be sorted or processed by the rotating data-sorting network. The rotating data-sorting network may apply the sort key to sift through large data streams to find specific values or values with a given property.

In some embodiments, the rotating data-sorting network may order any numerical values, including unsigned, signed, integer, fractional, etc. In some embodiments, the rotating data-sorting network processes strings, Boolean types, integers, or float types. Numbers are generally compared using numeric comparison operators such as "<" (less than), "=" (equal), and ">" (greater than). When voltage, current, dates, times, or other data values are not internally represented as numbers, sorting logic may convert them to numbers to permit numeric comparison. The sorting logic may be made more complex when fields include the possibility of null values. Multiple comparators may be used to create a customized sort. Logic may be used to test data types and to select the appropriate conversions and comparisons to improve efficiency of the sorting.

The rotating data-sorting network may include a reset feature. The reset feature may clear a current list and begin a new sort. The reset feature allows multiple data sets to be compared independently.

Any "communications network" or "network" disclosed herein may include a wide variety of network infrastructures. In some embodiments, a network is formed by coupling several nodes on an FPGA board. In other embodiments, the network may couple remote devices. Specifically, a network may incorporate landlines, wireless communication, optical connections, various modulators, demodulators, small form-factor pluggable (SFP) transceivers, routers, hubs, switches, and/or other networking equipment. The network may include communications or networking software, such as software available from Novell, Microsoft, Artisoft, and other vendors, and may operate using TCP/IP, SPX, IPX, SONET, and other protocols over twisted pair cables, coaxial cables, optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

Computers for the rotating data-sorting network may comprise one or more modules. A module may include all or portions of other elements of the system. The modules may run multiple operations concurrently or in parallel by or on one or more processors. Portions of the disclosed modules, components, and/or facilities are embodied as executable instructions embodied in hardware or firmware, or stored on a non-transitory, machine-readable storage medium. The instructions may comprise computer program code that, when executed by a processor and/or computing device, causes a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. Portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The systems and methods described herein may be expanded for use in an enterprise and/or industrial environment in which a rotating data-sorting network or data-sorting method may be in communication with any number (i.e., hundreds or even thousands) of pairs of computer modules or other devices functioning in dual-primary or primary-backup configurations. Accordingly, a centralized rotating data-sorting network system may be capable of remotely sorting data for measurement devices and/or IEDs throughout an electric power delivery system. Similarly, a rotating data-sorting network may be adapted to sort data for measurement devices and/or IEDs within a substation of an electric power delivery system.

FIG. 1 is a rotating data-sorting network 100 with eight nodes 120-127, according to one embodiment. As illustrated, the eight nodes 120-127 are communicatively coupled in a closed loop. The rotating data-sorting network 100 may comprise a circular data structure that rotates data between a series of nodes 120-127, similar to the rotation of fan blades.

The nodes 120-127 may include memory elements, controlling logic, and input/output ports for interfacing with other nodes 120-127. The memory elements store data and associated metadata. The controlling logic compares new data to the current data and sorts the new data. The input/output ports allow for stored data to be shifted between nodes 120-127.

The rotating data-sorting network 100 may include N nodes 120-127. The number of nodes 120-127 may be altered based on need. In the illustrated embodiment, there are eight nodes. The nodes 120-127 may include one first node s[0], which may also be referred to as a genesis node 120. The genesis node 120 is the node 120-127 where the first value received is stored. The remaining nodes 120-127 (s[1]-s[7] in the present embodiment) are non-genesis nodes, which are the standard default nodes. A current root node, or "root node" 125, may be referred to as the node 120-127 that currently holds a root value. A root value may have different significance based on the comparator. For example a root node may be a global minimum value (if the sort key is for maximum values), a maximum value (if the sort key is for minimum values), or have chronological significance (if the sort key is for strictly equal to a value).

The rotating data-sorting network 100 may prime the nodes 120-127 by serially receiving a data set and sorting the values until the nodes 120-127 are filled. Every new value may be compared to all values at the same time. Over time, data samples may selectively shift positions from one node 120-127 to another, moving at most only once per new sample processed by the rotating data-sorting network 100. A data sample may move only by one node 120-127 in the data flow direction 102.

After the rotating data-sorting network 100 is primed (i.e., each node in the network is storing a sample), it may store a number of sorted values in the nodes 120-127 communicatively coupled in a closed loop. The rotating data-sorting network 100 may identify the current root node 125 comprising a first value of the sorted values. When the rotating data-sorting network 100 receives a new data value, the new data value may be compared to the sorted values stored in the plurality of nodes 120-127. If the new data value meets a target criteria based on the comparison, the rotating data-sorting network 100 discards the first value stored in the current root node 125, rotates values stored in a portion of the plurality of nodes by moving the value in each node 120-127 to an adjacent node in the closed loop, and stores the new data value in at the beginning of the rotated portion. The rotating data-sorting network 100 identifies a new current root node adjacent to the current root node 125. If the rotating data-sorting network 100 determines that the new data value does not meet the target criteria based on the comparison, the rotating data-sorting network 100 may discard the new data value, rotate values stored in the plurality of nodes 120-127 by moving the values in each node 120-127 to an adjacent node in the closed loop, and identify a new current root node adjacent to the current root node 125.

Nodes 120-127 may be connected by a logical link 130, rather than merely having a positional or spatial connection. The logical link 130 may route state information between nodes 120-127. For example, a first node may receive information about a state of a previous node and may send state information to a subsequent node. For instance, the first node may send information reporting that it will retain its current value or accept a new value.

Figure 2:
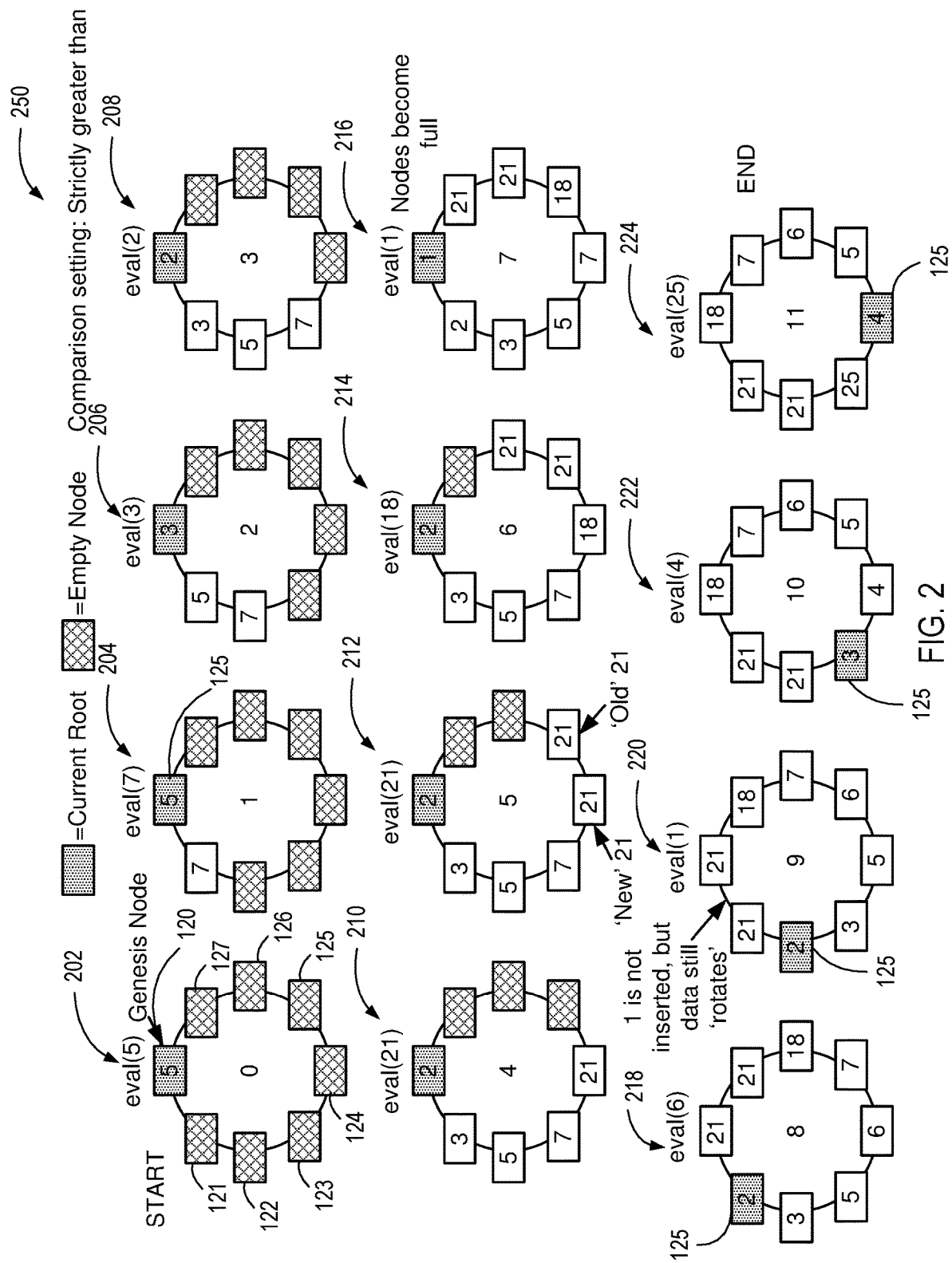
FIG. 2 illustrates a rotating data-sorting network receiving twelve data samples, according to one embodiment.

FIG. 2 illustrates a rotating data-sorting network 100 receiving twelve data samples. The rotating data-sorting network 100 may receive one data sample or data set at a time, which may then be sorted in ascending or descending order, according to one embodiment. In the example provided, the rotating data-sorting network 100 sorts the data in ascending order and sifts through a data stream to collect the maximum values.

The rotating data-sorting network 100 may maintain a maximum of "N" samples at any one time. In the illustrated embodiment, the rotating data-sorting network 100 includes N=8 nodes 120-127. If the memory or nodes 120-127 of the rotating data-sorting network 100 are completely full, then upon receiving a new sample that satisfies a specified sort key (global maximums in the present embodiment), the rotating data-sorting network 100 may eliminate the root value from the root node 125 to make space for the new sample.

The rotating data-sorting network 100 may sift, sort, and store a large data stream, or sort and store a finite data set. For example, eliminating the root values from the rotating data-sorting network 100 when new samples are inserted allows for sifting out the highest (if the sort key is to find a global minimum) or the lowest (if the sort key is to find the global maximum) N values from a large data set or data sample stream. Where the rotating data-sorting network 100 is given a finite data set of size less than or equal to N, the rotating data-sorting network 100 is also able to sort and store all of the data set.

In the present embodiment, the rotating data-sorting network 100 begins a sorting operation with eight empty nodes 120-127. The rotating data-sorting network 100 serially receives samples. During the first eight samples, the rotating data-sorting network 100 performs data sorting as the samples are received without rotating the root node 125. After the first eight samples are received, the rotating data-sorting network 100 is considered primed and sifts/sorts new samples while rotating the root node 125.

As shown, the rotating data-sorting network 100 receives a first sample, sample 0, at stage 202 containing the value "5." Because no samples are stored in any of the nodes 120-127, sample 0 is stored in the genesis node 120. Because the first sample value is the lowest value based on the sort key to find the maximum values, the genesis node 120 also serves as the current root node 125.

The rotating data-sorting network 100 then receives another sample, sample 1, at stage 204 containing the value "7." The rotating data-sorting network 100 compares sample 1 to the values currently stored in all of the nodes. Because "7" is greater than all of the currently stored samples, the rotating data-sorting network 100 stores sample 1 in an empty adjacent node in the data flow direction.

The rotating data-sorting network 100 then receives another sample, sample 2, at stage 206 containing the value "3." The rotating data-sorting network 100 compares sample 2 to the values currently stored in all of the nodes. Because "3" is less than all of the currently stored samples, the rotating data-sorting network 100 stores sample 2 in the root node 125 and shifts sample 0 and sample 1 to adjacent nodes in the data flow direction.

A similar process is followed for samples 3-7 (samples 3-7 are received during states 208-224) to prime the rotating data-sorting network 100. As shown, for sample 3 received at stage 208, the rotating data-sorting network 100 receives a value of "2," and "2" becomes the new current root node 125. For sample 4 received at stage 210, the new value "21" is stored in the circular data structure in ascending order. The next value received by the rotating data-sorting network 100 from sample 5 at stage 212 is also "21," and the new value enters the non-genesis node between the "7" and the previously received "21" value based on a setting of the operation 250 being "strictly greater than the other node values." Alternatively, if the setting of the operation 250 were "greater than or equal to the other node values," then the newly received value of "21" would insert to the right of the older "21" value. For sample 6 received at stage 214, a new value of "18" enters the rotating data-sorting network 100 between the "7" value and the most recent "21" value, and the "21" values are rotated to the next nodes in the data flow direction. With sample 7 received at stage 216, the circular data structure becomes full or primed because the rotating data-sorting network 100 has now received the maximum number of N values. The new value is "1," which becomes the new root node 125, while the other values are shifted by one node in the data flow direction.

Sample 8 received at stage 218 provides a value of "6" to the circular data structure. The rotating data-sorting network 100 compares the value in the sample to the samples stored in all of the nodes. Because "6" is greater than at least one of the values currently stored in the nodes, the root node discards the "1" value. The portion of the nodes containing values greater than "6" are then rotated to an adjacent node in the data flow direction. For instance, as shown, "21" moves to where the root node was discarded, the following "21" replaces the "21" moved to the root node, and so forth until the value "7" is moved. At that point the value "6" is inserted to the first node that is left empty by shifting the portion of nodes storing values greater than "6." The root node is also rotated to a node adjacent to the previous root node, causing the root node to store the lowest value of the collected data set.

Sample 9 received at stage 220 presents the rotating data-sorting network 100 with a "1" value. Because "1" is lower than any of the N values, it is not stored in any of the nodes 120-127. In the present embodiment, the circular data structure rotates the values stored in the nodes by one position in the data flow direction even though a new value is not inserted into the rotating data-sorting network 100. As shown, once all of the nodes 120-127 have a value, then the circular data structure rotates in the data flow direction every time a new comparison is made. Further, the root node rotates to an adjacent node to ensure the root node is storing the lowest value of the collected data set.

A similar process is followed for samples 10 and sample 11. Sample 10 received at stage 222 is a value of "4," which eliminates the "2" value being stored. The root node 125 now has a value of "3" because the "2" value was removed from the circular data structure. Finally, sample 11 received at stage 224 is a value of "25," which eliminates the "3" value that was being stored and makes the "4" value the new root node 125. The operation 250 is now complete because the rotating data-sorting network 100 has received all of the samples for the present embodiment. The operation 250 may enable a user to know where the maximum value (or minimum value, depending on the sort key) is at any given time.

In some embodiments, the number of nodes, N, is an integer greater than or equal to two, forming one genesis node 120 and at least one non-genesis node. In theory, there is not a theoretical maximum N, but N may be practically limited by the resource and timing constraints of the technology utilizing the rotating data-sorting network 100. For example, in some embodiments, the rotating data-sorting network 100 has all of the new data and new metadata reach the nodes 120-127 at the same time, which may serve as a practical limitation. Further, the rotating data-sorting network 100 also supports the space and logic complexity for the number of nodes used.

In some embodiments, all nodes 120-127 of the rotating data-sorting network 100 compare, according to a sort key, the value of the new data with the node's current data at a given time. The comparison of the nodes 120-127 may operate in parallel. During the parallel comparison, each node may forward a plurality of status bits to the next node in the data flow direction, which allows all of the nodes 120-127 to make the parallel comparison. For example, each node may compare its currently stored value to the value of the new data, then transmit the result of that comparison to an adjacent node in the data flow direction.

A single data sort may have a given latency, "L," to perform the data sort. The latency may be caused by the comparison operation and the reordering of elements. For instance, all of the nodes may compare the currently stored values to a new value and send the results to adjacent nodes during a first clock cycle. The elements in the rotating data-sorting network 100 may be reordered during a second clock cycle. In the present embodiment L equals two clock cycles. Further, the latency may stay the same regardless of the number of nodes in the rotating data-sorting network 100.

In one embodiment, nodes 120-127 may self-report their status. For example, each node may report if it is a root node 125 or is empty, etc. The nodes' process of self-reporting may eliminate the need to track head and tail pointers as is often required in other data sorting processes.

Nodes 120-127 may pulse a status signal that new data has been pushed into and accepted by the node, which may require a specific period. For example, in some embodiments, the nodes may pulse a status signal during one clock cycle. In some embodiments, time for each step in the sorting process could be modified/pipelined based on the design, with no effect on the sort.

In one embodiment, monitoring the status signal may provide an assessment as to whether the latest value was inserted into the rotating data-sorting network 100, thus eliminating the need for free memory address tracking. According to one embodiment, the rotating data-sorting network 100 may include various settings that enable sifting and sorting of values to be chronologically stable over an infinite set of data samples. For instance, the rotating data-sorting network 100 may be able to find and sort the minimum values of a continuous data stream, but will not be able to sort all of the values of the continuous data stream after the values exceed the number of nodes. If a maximum of N values is received and there are N nodes, then the sorting operation may be chronologically stable for all settings.

In the present embodiment, the time to process each individual value and deliver the sorted list is two clock cycles. Comparing a new data sample to the root node 125, as well as the total N nodes 120-127, requires one clock cycle, and then a second clock cycle is required to shift the data. The rotating data-sorting network 100 of the present embodiment may have a fixed time complexity for sorting a continual data stream of two clock cycles per element. The space complexity of the rotating data-sorting network 100 is a linear function, O(N), based on the number of nodes, where N is the total number of nodes. Thus, when new nodes are added, the time complexity remains the same and the space complexity grows at a linear rate.

In some embodiments, the rotating data-sorting network 100 may store data in memory to provide a sorted quality to the memory with little to no extra latency. In other embodiments, the rotating data-sorting network 100 may sort data as it is recalled from memory with little to no extra latency. Previously, a system sorting data stored in memory would be required to get the data from memory and utilize more time to sort the data. Whereas in the described embodiments the time it takes to sort data stored in memory is essentially the time required to recall the data from storage.

In addition to the nodes 120-127, the rotating data-sorting network 100 comprises a controlling logic that presents new data and metadata to the nodes 120-127 and pulses a "start" signal, also known as the "evaluate" signal. Further, in some embodiments, the FPGAs may be programmed in the very-high-speed integrated-circuit hardware description language "VHDL," Verilog or the like and have a basic register transfer level (RTL) digital circuit design. In various embodiments, the rotating data-sorting network 100 may be programmed using programming language such as Python.

In various embodiments, a custom logic block may be used to output only the signals that are necessary for a user's application. For example, a pseudocode example of a basic minimum or maximum location tracking for a primed rotating data-sorting network 100 may be represented as follows:

| Comparison Operator | Location of Minimum (data) | Location of Maximum (data) |
|---|---|---|
| new_data > current_data, new_data ≥ current_data | data_vector(sorted_root + 1) | data_vector (sorted_root) |
| new_data < current_data, new_data ≤ current_data | data_vector (sorted_root) | data_vector(sorted_root + 1) |

Sorted_root is the bit number from 0 to N of root_status which is asserted at a given time, indicating that the sorted_root+1 node has current root status. In other words the 'sorted_root' is not the index of the root element, but rather the one before it. The comparison may be done with unsigned math, and the read-out pointer may be constructed as an unsigned number which will rollover if the bounds exceed the number of nodes in the fan.

Figure 3:
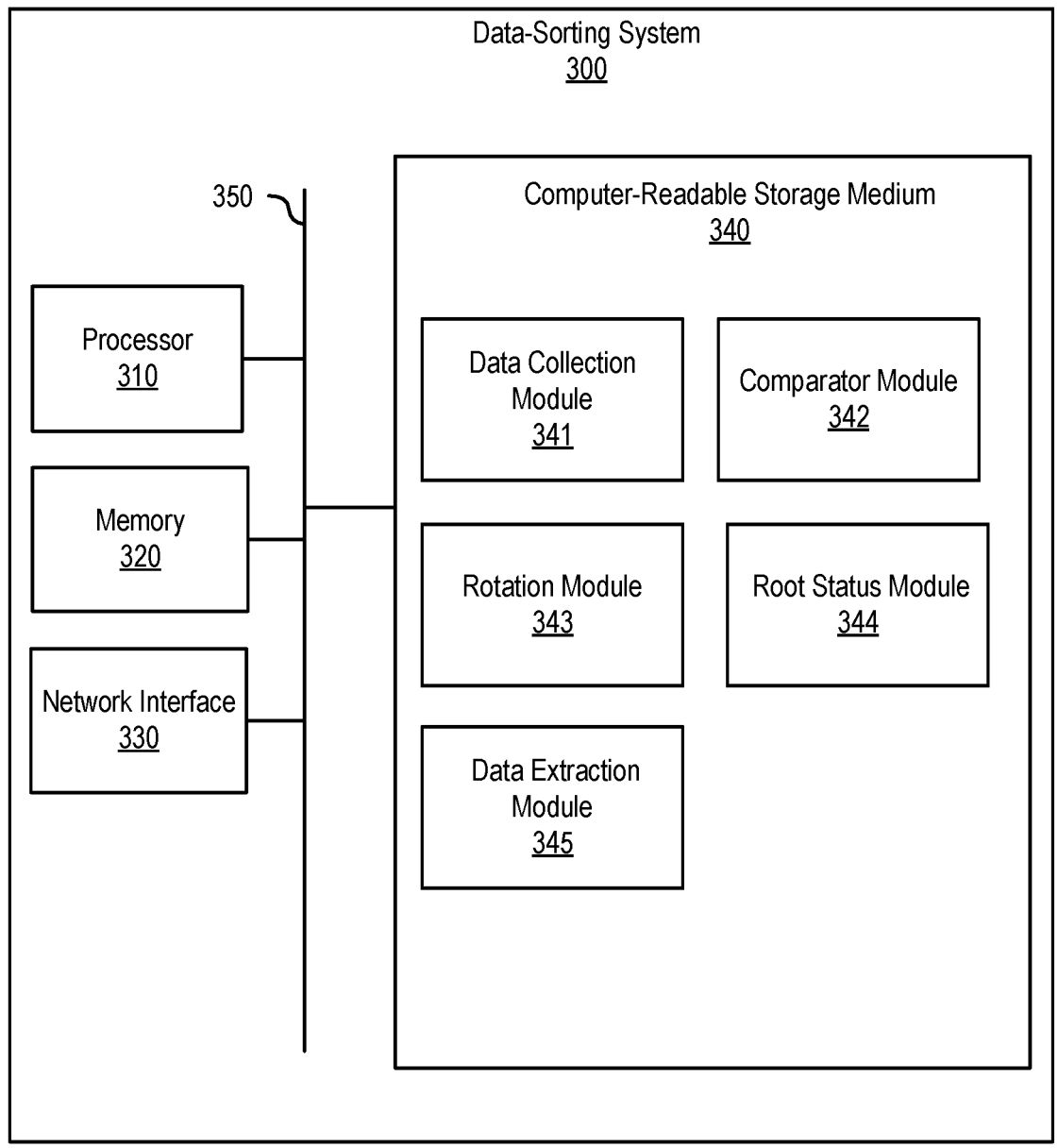
FIG. 3 is a functional block diagram of a data-sorting system for conducting data sorting using a circular data structure, according to one embodiment.

FIG. 3 is a functional block diagram of a data-sorting system 300 for conducting data sorting using a circular data structure, according to one embodiment. The data-sorting system 300 may be implemented on an FPGA that may be programmed using any one of many hardware description languages for digital circuit design, including VHDL and Verilog.

The data-sorting system 300 may be an IED or other computing system and include a processor 310, a memory 320, a network interface 330, and a computer-readable storage medium 340. The processor 310 may perform parallel processing of many voltage or current samples over a period of time. A bus 350 may connect the processor 310 to the computer-readable storage medium 340, memory 320, and network interface 330.

The memory 320 may be any piece of hardware capable of storing information such as data, computer programs, and/or other suitable information. The memory 320 may include volatile memory and/or non-volatile memory, and may be fixed or removable. The memory 320 may include RAM, ROM, a hard drive, a flash memory, a thumb drive, an optical disk, a magnetic tape, or some combination of the above. In one embodiment, the memory 320 may be used to store instructions to be executed by the processor 310.

The computer-readable storage medium 340 may be a non-transitory device, according to one embodiment, and include any number of modules 341-345 for performing parallel-operated data sorting. In some embodiments, one or more of the modules 341-345 may be implemented in hardware and/or firmware instead of software. In some embodiments, one or more of the modules 341-345 may be implemented in a cloud-based or remote location and interface via a communication interface, such as the network interface 330.

The computer-readable storage medium 340 may include a data collection module 341 to receive data to be sorted. In some embodiments, the data-sorting system 300 may monitor a high-voltage power line, and the data received may be current and/or voltage data. The data collection module 341 may include a set of sorting properties. Sorting properties may include a sorting order, a threshold value, and/or a time period. The sorting order may be ascending, descending, or chronologically. When sorting properties indicate ascending or descending sorting preferences, a comparator module 342 and a rotation module 343 may sort elements from the most negative to the most positive for ascending order, and from the most positive to the most negative for descending order.

The data-sorting system 300 may add any number of custom logic traversals to the genesis node or each individual node without increasing the latency of the rotating data-sorting network. For example, logic may be implemented prior to a genesis node implementing a threshold value that may exclude higher or lower values from the data-sorting system 300. For instance, if a voltage power line is being monitored, the threshold value may be set above the typical operating current value so the data-sorting system 300 only sorts overcurrent values. The same result may be accomplished by including custom logic to each node.

The computer-readable storage medium 340 may also include the comparator module 342, which may compare the received data with the currently stored data. The comparator module 342 may be in communication with a plurality of storage elements that are communicatively coupled to two adjacent storage elements forming a closed loop. In one embodiment a "Done" signal is emitted to indicate a node is done processing (regardless of action taken). A "pushed" signal may also be sent to indicate the node accepted the new data presented to the network (either zero or one nodes will pulse this per element presented). All nodes may pulse the "done" signal at the same time because each node began processing the new data at the same time and all of the nodes may have a similar latency.

Another module of the computer-readable storage medium 340 may be the rotation module 343, which sorts the received value and shifts the values stored in the plurality of storage elements. The rotation module 343 may determine that the new data value meets a target criteria based on the comparator module 342 output and, based on the determination, discard the lowest value (or highest value, if sifting for the minimum values in a data stream) stored in the current root storage element. The rotation module 343 may shift values stored in a portion of the plurality of storage elements by moving the value in each storage element to an adjacent storage element in the closed loop. The rotation module 343 may then store the new data value in a first storage element of the portion of the plurality of storage elements, and identify a new current root storage element adjacent to the current root storage element.

The computer-readable storage medium 340 may include a root status module 344, which may indicate the value present in the root node at any given time. This may provide easy access to a minimum and maximum value.

The computer-readable storage medium 340 may include a data extraction module 345, which provides traversal options for withdrawing the sorted data. For example, the data may be extracted in ascending, descending, or random order. In some embodiments, the data extraction module 345 may include custom traversals. For example, a traversal may output a median value first, or perform a binary search on the sorted data. The data extraction module 345 may include a "read-out pointer" that may select which data and metadata vectors to include.

The network interface 330 may transmit and/or receive information such as to and/or from other apparatus(es), network(s), etc. The network interface 330 may be configured to transmit and/or receive information by physical (wireline) and/or wireless communications links.

Figure 4:
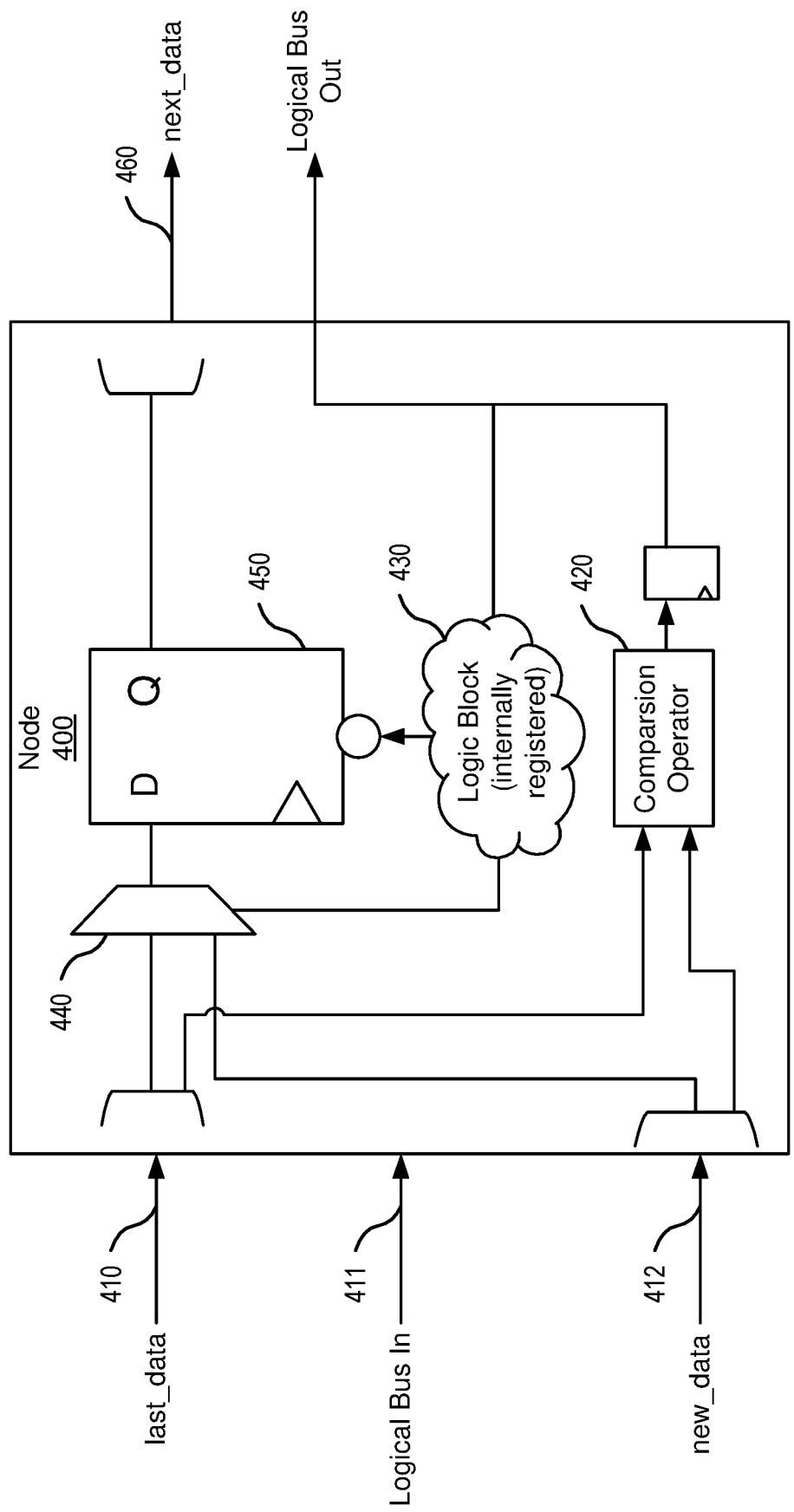
FIG. 4 is a block diagram of a node, according to one embodiment.

FIG. 4 is a block diagram of a node 400, according to one embodiment. The node 400 may include a previous node input 410, a new data input 412, a comparison operator 420, a logic block 430, a multiplexor 440, a register 450, and an output 460. The register 450 may store data and metadata.

The new data input 412 receives new data and associated metadata to be sorted. The new data input 412 is coupled to the comparison operator 420, which determines the relationship between the new data and the data currently stored in the register 450. The sorting mode of the comparison operator 420 may be selectable. In some embodiments, Booleans may be used to indicate the state of the comparison for the current and previous nodes. In some embodiments, the sorting mode of the comparison operator 420 may alter the time stability (i.e., consistent, relative ordering with respect to the time each sample is received). For example, the impact that four different sorting modes have on time stability is shown in Table 1:

TABLE 1

| Sorting Mode | Effective Sort Type | Time Stability | |
|---|---|---|---|
| > | Ascending with N maximum values, and priority to keep first occurrence of the value | Not time stable | More hardware efficient than ≥, but not time stable |
| ≥ | Ascending with N maximum values, and priority to keep most recent occurrence of the value | Time stable | |
| < | Descending with N minimum values, and priority to keep first occurrence of the value | Not time stable | More hardware efficient than ≤, but not time stable |
| ≤ | Descending with N minimum values, and priority to keep most recent occurrence of the value | Time stable | |

The sorting modes in Table 1 are illustrative and are not meant to be all inclusive. For example, some embodiments may include '=' mode for collecting occurrences of identical values. As another example, some embodiments may include a dual layer comparison (i.e. multiple criterion).

The previous node input 410 may receive the data and metadata stored in a previous node. In some embodiments, the previous node input 410 may receive the results of the previous node's comparison operator, indicating whether the previous node was greater than, equal to, or less than the new data. A logical bus in 411 may provide additional signals from previous nodes. For example, the logical bus in 411 may receive the value or the result of the previous node's Boolean from the previous node.

The previous node input 410 may be coupled to the multiplexor 440 that is also fed by the new data input 412. Based on the results of the comparison of the new data to the currently stored node data and the results of the previous node's comparison operator, the logic block 430 may control the multiplexor 440 and the register 450. The logic block 430 may instruct the register 450 to hold the current data or overwrite the current data with the output of the multiplexor 440. The output of the multiplexor 440 may be selected between the data from the previous node or the new data.

Table 2 below illustrates one possible set of logic conditions under which the logic block 430 may operate. Note that in Table 2, $C_{last}$ is the result of the previous node's Boolean, and $C_{current}$ is the result of the comparison operator 420 associated with the current node 400.

TABLE 2

| List Status | Logic Condition | Current Node Action |
|---|---|---|
| Empty | This node is the Genesis Node | Accept new data |
| Partial | This node is the Genesis Node and [$C_{current}$ == FALSE] | Accept new data |
| N/A | [$C_{last}$ == AND This node is the current root | Accept new data |
| N/A | TRUE] and This node is empty | Accept new data |
| N/A | the last [$C_{current}$ == FALSE] | Accept new data |
|  | node has valid data |  |
| N/A | Last is not empty and [$C_{last}$ == FALSE] | Accept last node's data |
| N/A | All other states | No action; hold value |

Figure 5:
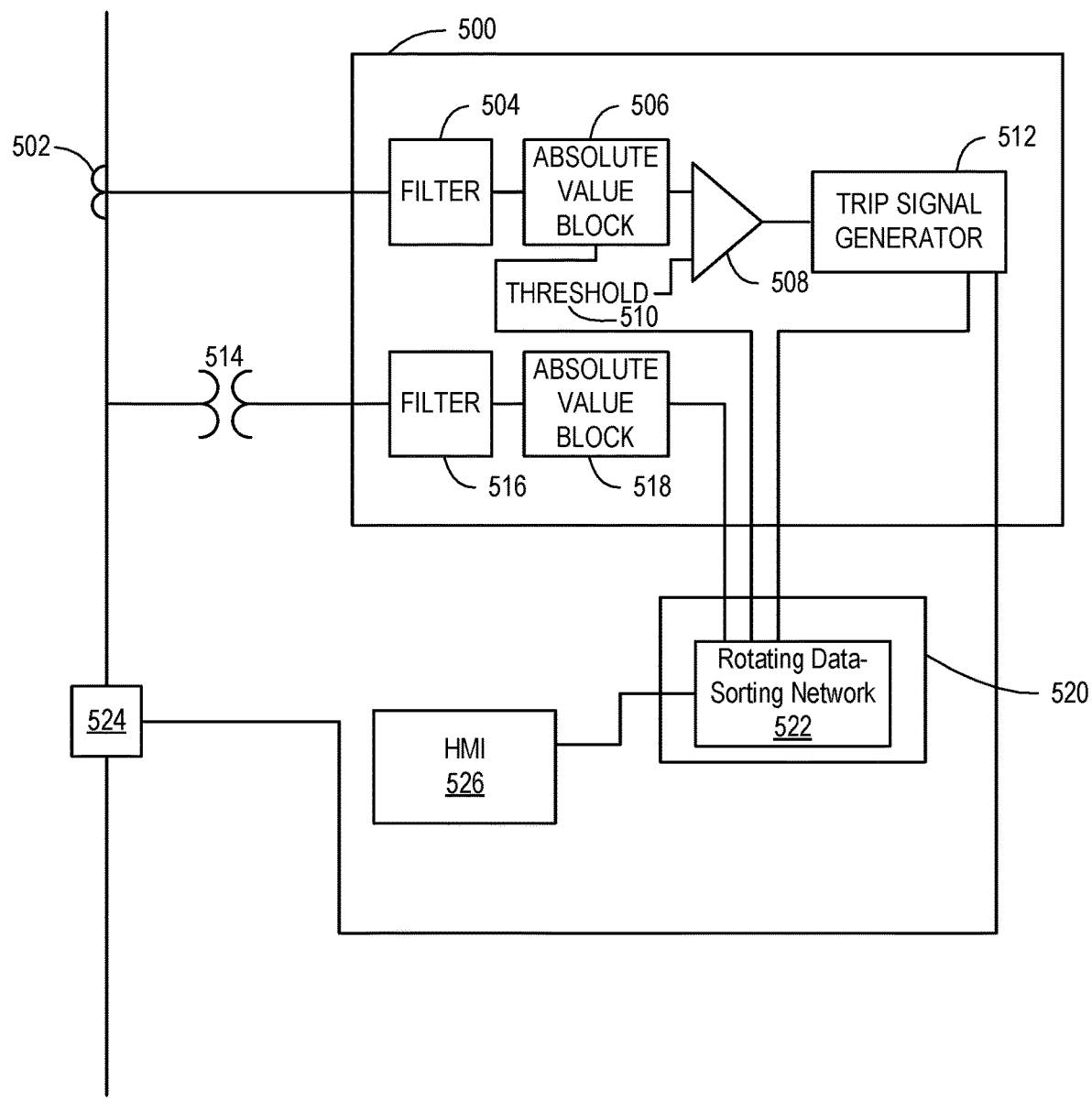
FIG. 5 is a block diagram of an intelligent electronic device (IED) using a rotating data-sorting network, according to one embodiment.

FIG. 5 is a functional block diagram of an IED 500 using a rotating data-sorting network 522, according to one embodiment. In one embodiment the IED 500 may be a digital relay that may identify the location of an abnormality in voltage and/or current for a three-phase system and emit a trip signal. According to one embodiment, a current transformer (CT) 502 may isolate a current signal for measurement. The current signal may be sent to the IED 500, which may comprise a filter 504 to convert the current measurement into a discrete value using an ND converter (not shown). The discrete current measurement values may then flow to an absolute value block 506 to generate an absolute value of the digital current measurements by rectifying the values. The rectified values may flow to a comparator 508, which may compare the measurements to a threshold 510. If the current values exceed the threshold 510, then a signal is sent to a trip signal generator 512. The trip signal generator 512 may release a signal to a circuit breaker 524 to trip based on the output from the trip signal generator 512.

Further, a potential transformer (PT) 514 may isolate a voltage for measurement. The voltage may be transmitted to the IED 500, which filters the voltage using a filter 516 to convert the voltage to a discrete value using an ND converter (not shown). The discrete value may pass through an absolute value block 518 to generate a rectified value of the digital voltage.

The IED 500 may transmit the rectified voltage and current values to a computer 520 for sorting the data. The computer 520 may include the disclosed rotating data-sorting network 522 comprising a circular data structure. The rotating data-sorting network 522 may then sort the data based on programmed sort keys. For example, the IED 500 is typically used to detect an overcurrent or overvoltage condition. If the rotating data-sorting network 522 is configured to sort the highest values of the current or voltages, the rotating data-sorting network 522 will sift out and sort the values of interest (e.g., the highest currents or voltages) from a continuous stream of values over some time period/interval of interest.

After sorting the data, the rotating data-sorting network 522 may send the sorted data to an HMI 526. The HMI may receive digital voltage and/or current data, as well as other information from the computer 520, and display the data. In some embodiments, this may be useful for a user to view all of the maximum overcurrent values. In some embodiments, the rotating data-sorting network 522 and the HMI 526 may be part of the IED 500.

The rotating data-sorting network 522 may include a reset feature. The reset feature may clear a current list and begin a new sort. The reset feature allows multiple data sets to be compared independently.

Figure 6:
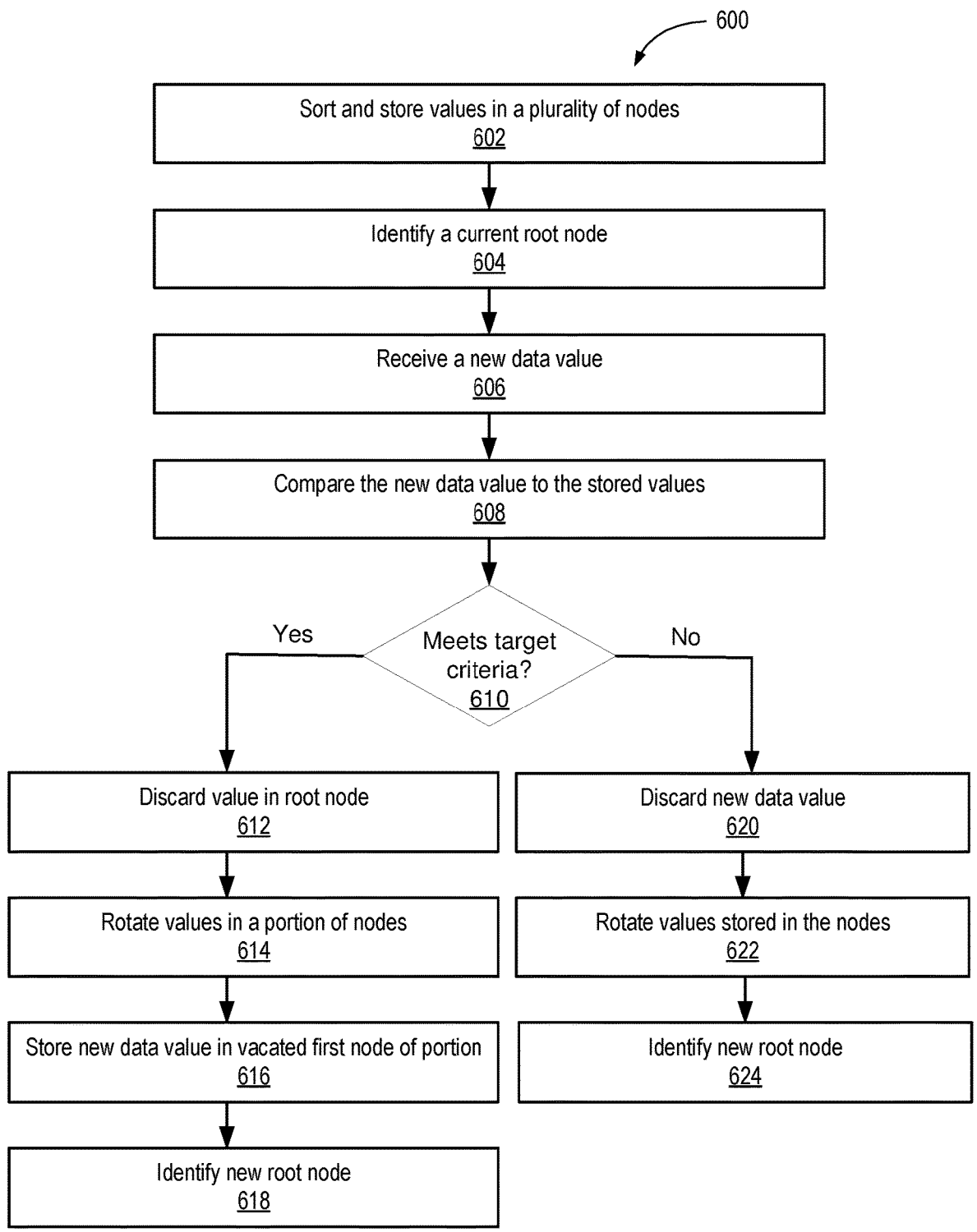
FIG. 6 is a flow chart of a method for sifting and sorting data using a rotating data-sorting network, according to one embodiment

FIG. 6 is a flow chart of a method 600 for sifting and sorting data using a rotating data-sorting network, according to one embodiment. A rotating data-sorting network may sort and store 602 a number of sorted values in a plurality of nodes communicatively coupled in a closed loop. The number of values stored corresponds to the number of nodes. The rotating data-sorting network may identify 604 a current root node comprising a first value of the sorted values.

When all of the nodes are full and the rotating data-sorting network receives 606 new data value, it may compare 608 the new data value to the sorted values stored in the plurality of nodes, and determine 610 whether the new data value meets a target criteria based on the comparison.

Based on determining 610 that the target criteria is met, the rotating data-sorting network may discard 612 the first value stored in the current root node. The rotating data-sorting network may rotate 614 or shift values stored in a portion of the plurality of nodes by moving the value in each node to an adjacent node in the closed loop. The rotating data-sorting network may store 616 the new data value in a first node of the portion of the plurality of nodes which is left empty by rotating the portion. The rotating data-sorting network may identify 618 a new current root node adjacent to the current root node.

Alternatively, at 610, if the new data value does not meet the target criteria, the new data value may be discarded 620. The rotating data-sorting network may rotate 622 the values stored in the plurality of nodes by moving the values in each node to an adjacent node in the closed loop, and identify 624 a new current root node adjacent to the current root node.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

The embodiments disclosed herein may be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the embodiments and methods of the disclosure are not intended to limit the scope of the disclosure, as claimed, but are merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic and/or processor executable instructions.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure includes all permutations of the independent claims with their dependent claims.

It will be apparent to those having skill in the art that changes may be made to the details of the above-described embodiments without departing from the underlying principles of the invention. Embodiments of the invention in which an exclusive property or privilege is claimed are defined as follows.

What is claimed is:

1. A method for sifting data comprising:
   storing a number of sorted values in a plurality of distributed nodes in a closed loop;
   identifying a current root node comprising a first value of the sorted values;
   receiving a new data value; and
   determining that the new data value meets a target criteria, and based on the determination:
      discarding the first value stored in the current root node,
      rotating values stored in a portion of the plurality of nodes by moving the value in each node in the portion of the plurality of nodes in the same direction to store in a respective adjacent node in the closed loop to allow for storing the new data value and for maintaining sorting of the values in the closed loop within a fixed length of time, independent of the number of distributed nodes,
      storing the new data value in a first node of the portion of the plurality of nodes, and
      identifying a new current root node adjacent to a node that was previously identified as the current root node.

2. The method of claim 1, further comprising:
   comparing, in parallel, the new data value to each of the sorted values stored in the plurality of nodes at the same time, and wherein determining that the new data value meets a target criteria is based on the comparison.

3. The method of claim 2, further comprising:
   determining that the new data value does not meet the target criteria based on the comparison, and based on the determination:
      discarding the new data value,
      rotating values stored in the plurality of nodes by moving the values in each node to an adjacent node in the closed loop, and
      identifying a new current root node adjacent to a node that was previously identified as the current root node.

4. The method of claim 1, further comprising:
   sorting a number of values, until the plurality of nodes are filled, by:
      storing a first value in a first empty node,
      receiving a second value,
      comparing the first value to the second value, and
      storing the second value based on the comparison.

5. The method of claim 1, wherein for new data values greater than at least one of the sorted values, the new data value meets the target criteria.

6. The method of claim 5, wherein the portion of the plurality of nodes rotated contains values at least equal to the new data value.

7. The method of claim 1, wherein for new data values less than at least one of the sorted values, the new data value meets the target criteria.

8. The method of claim 7, wherein the portion of the plurality of nodes rotated contains values at most equal to the new data value.

9. The method of claim 1, further comprising discarding new data values that do not meet a target threshold.

10. The method of claim 1, further comprising extracting the values stored in the plurality of nodes as an ordered list.

11. A non-transitory computer-readable medium with instructions stored thereon that, when executed by a processor, cause a computing device to sample a data set and sort a set of maximum values from the data set, the operations comprising:

storing a number of sorted values in a plurality of distributed nodes communicatively coupled in a closed loop;

identifying a current root node comprising a smallest value of the sorted values;

receiving a new data value;

comparing, in parallel, the new data value to the sorted values stored in the plurality of nodes; and determining that the new data value is greater than at least one value stored in the plurality of nodes, and based on the determination:

discarding the smallest value stored in the current root node, rotating values that are at least equal to the new data value by moving, in a first direction, the value in each node to store in a respective adjacent node in the closed loop, the rotating placing a highest value in the current root node and leaving an empty node adjacent to a smallest value of the values that are at least equal to the new data to allow for adding the new data value and for maintaining sorting of the values within a fixed length of time, independent of the number of nodes, storing the new data value in the empty node, and identifying a new current root node adjacent to the current root node.

12. The non-transitory computer-readable medium of claim 11, the operations further comprising extracting data from the current root node to identify a minimum value.

13. The non-transitory computer-readable medium of claim 11, the operations further comprising extracting data from a node adjacent to the current root node to identify a maximum value.

14. The non-transitory computer-readable medium of claim 11, the operations further comprising:

determining that the new data value is less than all of the sorted values, and based on the determination:

discarding the new data value, rotating values stored in the plurality of nodes by moving the values in each node to an adjacent node in the closed loop, and identifying a new current root node adjacent to the current root node.

15. A computing device for sampling and sorting a set of minimum values of a data set, the computing device comprising:

a plurality of registers configured to store a number of sorted values, each of the registers being communicatively coupled to two adjacent registers to form a closed loop, the plurality of storage elements comprising one root register with a highest value;

an input to receive a new data value;

a plurality of comparators in communication with the input, at least one comparator is associated with each of the plurality of registers, the comparators determining in parallel which sorted values in the registers are at most equal to the new data value; and a plurality of multiplexors, each multiplexor providing values to an associated register based on the determination of the comparators for the associated register and a register adjacent to the associated register to cause at least a portion of the values in the respective associated registers to rotate in the same direction to store the values in the respective adjacent registers in the closed loop to add the new data value and to maintain sorting of the values within a fixed length of time, independent of the number of nodes.

16. The computing device of claim 15, wherein each storage element comprises a register.

17. The computing device of claim 15, wherein each storage element receives data from a first adjacent storage element and data stored in each storage is sent to a second adjacent storage element.

18. The computing device of claim 15, further comprising an initial comparator to determine if the new data value meets a target threshold.

19. The computing device of claim 15, wherein the data from the root storage element may be extracted to find a maximum value.

20. The computing device of claim 15, wherein the data from a storage element adjacent to the root storage element may be extracted to find a minimum value.

21. The computing device of claim 15, wherein for new data values that are less than the value stored in the storage element adjacent to the associated storage element and greater than the value stored in the associated storage element, each multiplexor provides the associated storage element with the new data value.

22. The computing device of claim 21, wherein for new data values that are greater than the value stored in the storage element adjacent to the associated storage element, each multiplexor provides the associated storage element with the value stored in the storage element adjacent to the associated storage element.

* * * * *